US011126492B1

(12) United States Patent
Graklanoff et al.

(10) Patent No.: US 11,126,492 B1
(45) Date of Patent: Sep. 21, 2021

(54) SYSTEMS AND METHODS FOR ANOMALY ANALYSIS AND OUTAGE AVOIDANCE IN ENTERPRISE COMPUTING SYSTEMS

(71) Applicant: Express Scripts Strategic Development, Inc., St. Louis, MO (US)

(72) Inventors: Jason T. Graklanoff, Edwardsville, IL (US); Michael D. Trapani, Rochester, NY (US); Scott H. Reid, Lynbrook, NY (US); Raoul J. Paver, Orono, MN (US); James Norberg, Sunset Hills, MO (US); Jason A. Pinto, Wentzville, MO (US)

(73) Assignee: Express Scripts Stategic Development, Inc., St. Louis, MO (US)

(*) Notice: Subject to any disclaimer, the term of this patent is extended or adjusted under 35 U.S.C. 154(b) by 72 days.

(21) Appl. No.: 16/674,750

(22) Filed: Nov. 5, 2019

(51) Int. Cl.
*G06F 11/00* (2006.01)
*G06F 11/07* (2006.01)
*G06F 9/54* (2006.01)
*G06F 11/30* (2006.01)

(52) U.S. Cl.
CPC ............ *G06F 11/079* (2013.01); *G06F 9/542* (2013.01); *G06F 11/3006* (2013.01); *G06F 11/3055* (2013.01)

(58) Field of Classification Search
CPC . G06F 11/079; G06F 11/0793; G06F 11/3006
See application file for complete search history.

(56) References Cited

U.S. PATENT DOCUMENTS

| 6,000,040 A * | 12/1999 | Culley ............... G06F 11/0745 714/31 |
| 7,996,814 B1 * | 8/2011 | Qureshi ............... G06F 11/079 717/120 |
| 8,682,886 B2 | 3/2014 | Sorkin |
| 8,683,467 B2 | 3/2014 | Bingham |
| 8,874,740 B2 | 10/2014 | Ketchum |
| 9,183,033 B2 * | 11/2015 | Wang ................. G06F 9/45558 |
| 9,185,007 B2 | 11/2015 | Fletcher |

(Continued)

OTHER PUBLICATIONS

2019 Revised Patent Subject Matter Eligibility Guidance Appendix 1 pages 30-41 (Year: 2019).*

(Continued)

*Primary Examiner* — Jonathan D Gibson
(74) *Attorney, Agent, or Firm* — Stinson LLP

(57) ABSTRACT

A method is provided for diagnosing probable root causes of anomalies in computing environments. The method is performed by an anomaly analytics server in networked communication with hosts. The method includes (a) receiving a topology map; (b) receiving event data associated with each host; (c) receiving an anomaly baseline defining thresholds for identifying an anomalous status in each host application; (d) analyzing the event data and the anomaly baseline to determine a host anomaly status for each host; (e) analyzing the host anomaly status and the topology map to determine a tier anomaly status for each of the host tiers; (f) identifying at least one host tier as a root cause host tier by processing the tier anomaly statuses and the set of tier dependencies; and (g) generating an alert identifying each root cause host tier as a probable root cause of an anomaly.

20 Claims, 9 Drawing Sheets

(56) References Cited

U.S. PATENT DOCUMENTS

| | | | |
|---|---|---|---|
| 9,246,773 B2* | 1/2016 | Degioanni | H04L 41/22 |
| 9,311,176 B1* | 4/2016 | Khokhar | G06F 11/0766 |
| 10,043,006 B2 | 8/2018 | Puri | |
| 10,230,609 B2 | 3/2019 | Chandrasekaran | |
| 10,404,859 B1 | 9/2019 | Hernandez | |
| 10,447,852 B2 | 10/2019 | Baker | |
| 10,503,580 B2* | 12/2019 | Musuvathi | G06N 20/00 |
| 10,599,506 B2* | 3/2020 | Cohen | G06F 11/3072 |
| 10,877,867 B1* | 12/2020 | Campbell | G06F 11/327 |
| 10,884,839 B2* | 1/2021 | Ramachandran | G06F 11/0769 |
| 10,922,163 B2* | 2/2021 | Spencer | G06F 11/079 |
| 2011/0107148 A1* | 5/2011 | Franklin | G06F 11/0748 714/37 |
| 2014/0372347 A1* | 12/2014 | Cohen | G06N 20/00 706/12 |
| 2015/0007197 A1* | 1/2015 | Tripp | G06F 9/445 718/106 |
| 2015/0095102 A1 | 4/2015 | Hanley | |
| 2016/0057041 A1* | 2/2016 | Gupta | H04L 41/5025 706/12 |
| 2016/0224400 A1* | 8/2016 | Shafique | G06F 11/0709 |
| 2017/0364404 A1* | 12/2017 | Yang | G06F 11/079 |
| 2018/0046581 A1* | 2/2018 | Banerjee | G06F 12/1009 |
| 2018/0063328 A1 | 3/2018 | Eisner | |
| 2018/0227192 A1 | 8/2018 | Jain | |
| 2018/0365093 A1* | 12/2018 | Musuvathi | G06F 11/3447 |
| 2019/0132230 A1 | 5/2019 | Chandrasekaran | |
| 2020/0014581 A1* | 1/2020 | Aaron | H04L 12/28 |
| 2020/0034224 A1* | 1/2020 | Nagendra | G06F 11/0793 |
| 2020/0151042 A1* | 5/2020 | Spencer | G06F 11/0751 |
| 2020/0310898 A1* | 10/2020 | Yano | G06F 11/0793 |
| 2020/0348662 A1* | 11/2020 | Cella | G05B 23/024 |

OTHER PUBLICATIONS https://www.splunk.com/en_us/software/splunk-enterprise/machine-learning.html, 2005.

* cited by examiner

SYSTEMS AND METHODS FOR ANOMALY ANALYSIS AND OUTAGE AVOIDANCE IN ENTERPRISE COMPUTING SYSTEMS

FIELD OF INVENTION

The field relates to predictive analytical techniques and systems for use in detection and analysis of anomalous application events and states, reduced mean-time-to-resolution of system disruption, and reduced outage time in data centers and other enterprise computing systems.

BACKGROUND OF THE DISCLOSURE

In enterprise technology environments, it is highly desired to ensure the availability of applications, systems, data, connectivity, and communications. As a result, the information technology ("IT") organizations responsible for enterprise technology infrastructure typically seek to reduce the amount of time spent in diagnosing and resolving disruptions, outages, and anomalies that may occur in applications of the environment. IT organizations typically seek to quantify such amount of times using metrics including but not limited to mean-time-to-resolution (MTTR), outage duration minutes (ODMs), and the percentage of time that a system or application is available. IT organizations typically monitor these metrics with a goal of minimum ODMs, minimum MTTR, and a maximum of system or application availability.

In order to reach these and related goals IT organizations are limited by their capabilities to understand the environment state and to efficiently diagnose anomalous events or states based on such an understanding. Further, such organizations are limited by their capabilities to resolve any anomalous events or states.

Known tools allow for logging of events and errors, but the value of such tools is limited because IT organizations still need to review such logs and analyze them to determine probable root causes and to take any necessary remedial steps to resolve errors and anomalies.

Accordingly, systems and methods for determining probable root causes of anomalies based on predictive analytical techniques and correlations are desired in order to enhance the availability of IT infrastructure.

BRIEF SUMMARY OF THE INVENTION

In one aspect, an anomaly analysis system for diagnosing probable root causes of anomalies in computing environments is provided. The anomaly analysis system includes a set of hosts. Each of the hosts includes a host processor and a host memory. Each of the host processors executes at least one host application. The anomaly analysis system also includes an anomaly analytics server including a processor and a memory. The anomaly analytics server is in networked communication with the hosts via a network. The processor is configured to (a) receive a topology map associating each host with a host tier of host tiers, and defining a set of tier dependencies between the host tiers; (b) receive event data associated with each host; (c) receive an anomaly baseline defining thresholds for identifying an anomalous status in each host application; (d) analyze the event data and the anomaly baseline to determine a host anomaly status for each host; (e) analyze the host anomaly status and the topology map to determine a tier anomaly status for each of the host tiers; (f) upon determining that any host anomaly status indicates an anomaly has occurred, identify at least one host tier as a root cause host tier by processing the tier anomaly statuses and the set of tier dependencies; and (g) generate an alert identifying each root cause host tier as a probable root cause of an anomaly in the anomaly analysis system.

In another aspect, an anomaly analytics server for diagnosing probable root causes of anomalies in computing environments is provided. The anomaly analytics server includes a processor and a memory. The anomaly analytics server is in networked communication with hosts via a network. Each of the hosts includes a host processor and a host memory. Each of the host processors executes at least one host application. The processor is configured to (a) receive a topology map associating each host with a host tier, and defining a set of tier dependencies between the host tiers; (b) receive event data associated with each host; (c) receive an anomaly baseline defining thresholds for identifying an anomalous status in each host application; (d) analyze the event data and the anomaly baseline to determine a host anomaly status for each host; (e) analyze the host anomaly status and the topology map to determine a tier anomaly status for each of the host tiers; (f) upon determining that any host anomaly status indicates an anomaly has occurred, identify at least one host tier as a root cause host tier by processing the tier anomaly statuses and the set of tier dependencies; and (g) generate an alert identifying each root cause host tier as a probable root cause of an anomaly.

In yet another aspect, a method is provided for diagnosing probable root causes of anomalies in computing environments. The method is performed by an anomaly analytics server including a processor and a memory. The anomaly analytics server is in networked communication with hosts via a network. Each of the hosts includes a host processor and a host memory. Each of the host processors executes at least one host application. The method includes (a) receiving a topology map associating each host with a host tier, and defining a set of tier dependencies between the host tiers; (b) receiving event data associated with each host; (c) receiving an anomaly baseline defining thresholds for identifying an anomalous status in each host application; (d) analyzing the event data and the anomaly baseline to determine a host anomaly status for each host; (e) analyzing the host anomaly status and the topology map to determine a tier anomaly status for each of the host tiers; (f) upon determining that any host anomaly status indicates an anomaly has occurred, identifying at least one host tier as a root cause host tier by processing the tier anomaly statuses and the set of tier dependencies; and (g) generating an alert identifying each root cause host tier as a probable root cause of an anomaly.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
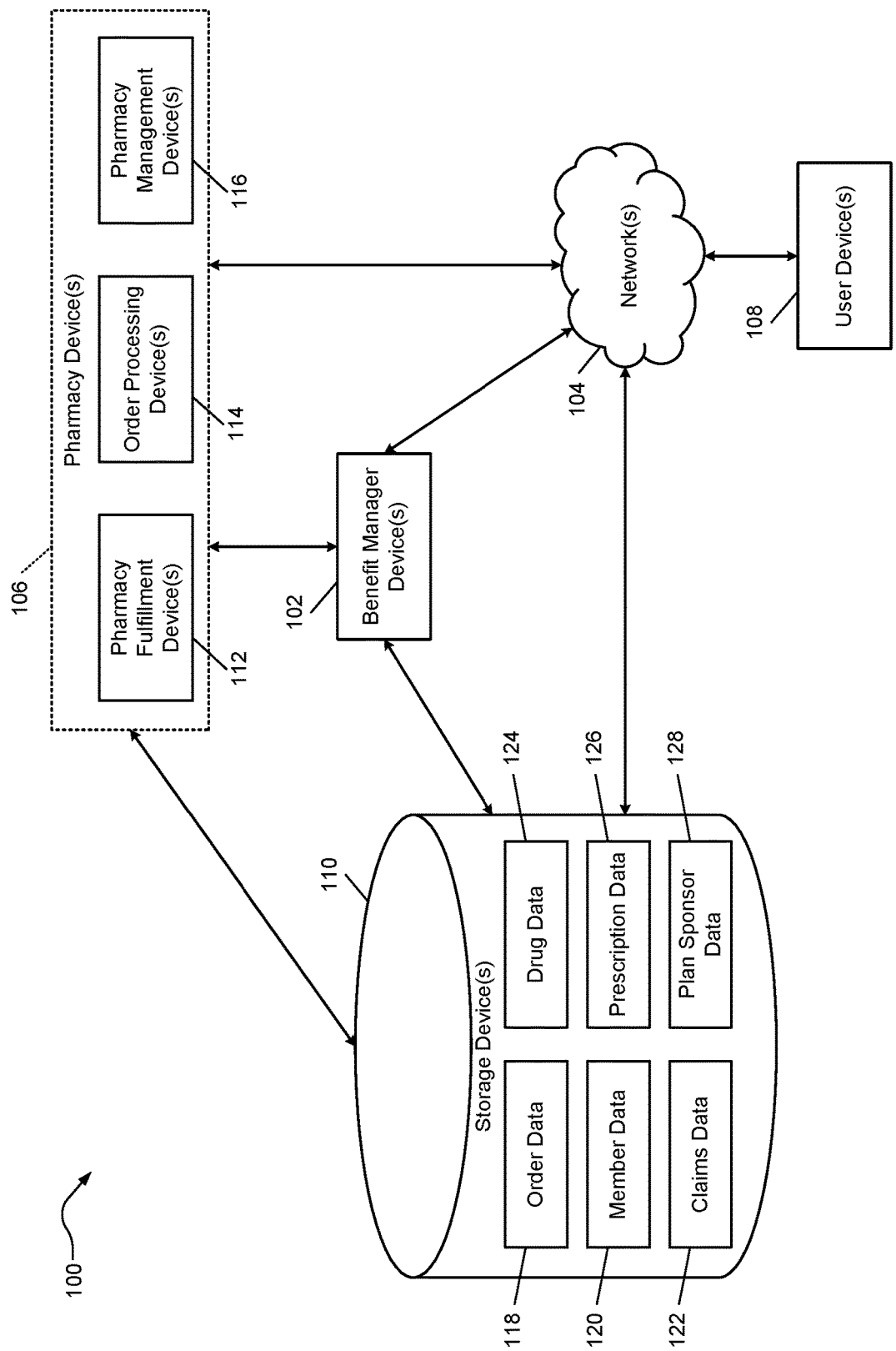
FIG. 1 is a functional block diagram of an example system including a high-volume pharmacy.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "root cause analysis" or "RCA" refers to a method of problem solving used to identify the root cause for an anomaly, a fault, or a problem. Generally, a root cause analysis requires identification of a problem, distinction between a root cause and other causal factors, and determining a likely relationship between a root cause and an anomaly.

As used herein, the term "anomaly" refers to a behavior or state that is significantly different from the normal expected state or normal data. Specifically as used herein, an anomaly refers to a behavior or state of an application that deviates significantly from the normal behavior.

As used herein, the term "tier" refers to a conceptual layer or level of computing applications, servers, devices, or systems in the architecture of a computing environment. In one typical example, applications may be grouped into separate tiers for data access, business, application, and presentation. These examples are illustrative and tiers may be differently defined, or more or less granular.

As used herein, the term "computing environment" refers to a distributed computing system with a variety of systems, applications, software, and functions that are interconnected and provide collective functionality to one another and to external devices. A computing environment may include computing systems that are tiered based on application category, grouped based upon service capabilities, or otherwise categorized based on a common set of characteristics.

In view of known problems associated with administering and managing complex IT environments, IT administrators require systems and methods for determining probable root causes of anomalies based on predictive analytical techniques and correlations are desired in order to enhance the availability of their IT infrastructure.

The systems and methods disclosed provide a robust mechanism for diagnosing probable root causes of anomalies in technology infrastructures. Specifically, the systems and methods provide a precognitive model for assessing and analyzing event data at a service tier and application specific level to identify anomalous behavior in hosts based upon historical norms. The systems and methods further provide a method for end-to-end analysis of host applications from the end-user to the bottom (deepest level) of the application stack in order to identify anomalous behavior in hosts. The systems and methods utilize a topological map to consider host tier dependencies, and identify probable root cause tiers at the deepest level of the stack by, in part, applying a signal-echo model. Through such functionalities, the systems and methods effectively provide a model for RCA that applies predictive analytics to identify behaviors that are likely to cause an anomaly or anomalies in the system. Resultantly, the systems and methods function to improve the functioning of the systems and applications of the technology environment by isolating and identifying probable root causes of performance issues. Necessarily, the systems and methods improve the availability and performance of such systems and applications by the use of techniques that are necessarily rooted in computer networking.

The systems and methods are performed by an anomaly analytics server including within the anomaly analytics system. The anomaly analytics server includes a processor and a memory. The anomaly analytics server is in networked communication with a set of hosts via a network. Each of the hosts includes a host processor and a host memory, and each of the host processors executes at least one host application.

The anomaly analytics server is configured to (i) receive a topology map associating each host with a host tier of host tiers, and defining a set of tier dependencies between the host tiers; (ii) receive event data associated with each host; (iii) receive an anomaly baseline defining thresholds for identifying an anomalous status in each host application; (iv) analyze the event data and the anomaly baseline to determine a host anomaly status for each host; (v) analyze the host anomaly status and the topology map to determine a tier anomaly status for each of the host tiers; (vi) upon determining that any host anomaly status indicates an anomaly has occurred, identify at least one host tier as a root cause host tier by processing the tier anomaly statuses and the set of tier dependencies; and (vii) generate an alert identifying each root cause host tier as a probable root cause of an anomaly.

Further, the anomaly analysis system is configured to execute a series of processes that collectively facilitate diagnosing probable root causes of anomalies in computing environments. In particular, the processes include (a) performing a precognition analysis by processing historical event data to identify patterns and define event data metrics that are anomalous for a given host application, host tier, and service type to reduce mean-time-to-resolution ("MTTR") and outage duration minutes ("ODMs"), (b) performing an autocorrelation process by receiving and processing a topology map and event data to iteratively analyze every path through the host tiers of the computing environment and identify anomaly patterns within host tiers, and across host tiers, (c) classifying host tiers that are anomalous according to a first algorithm, (d) analyzing dependency relationships between host tiers that are classified as anomalous, (e) identifying probable root causes of anomalies in the host tiers, (f) generating targeted and specific messages to advise administrators of identified probable root causes of anomalies, and (g) providing user interface dashboards to administrators to allow for review of anomaly events identified in precognition analysis and anomaly patterns identified in autocorrelation.

The anomaly analytics server is configured to perform the precognition analysis by processing historical event data to identify patterns and define event data metrics that are anomalous for a given host application, host tier, and service type. More specifically, the anomaly analytics server identifies a metric associated with each host application of the available host applications. In some examples, the metric may be identified by default, a schematic input, or user definitions. In at least one example, the metric is identified automatically by processing event data associated with each host application to identify variables in host data that are most correlated to identified anomalous behavior. In such examples, the anomaly analytics server performs correlation of all variables in host data to determine the metric that is statistically significant in predicting an anomaly.

In many examples, metrics are specific to a particular host application and relate to event data specific to that particular host application. For example, an application server metric may include a set of login errors specific to the application server including, for example, a general login error, an invalid user name login error, and an unknown login error. In these and similar examples, a metric may reflect a numeric count of the login errors as such events reflect a deviation from a normal result, even if such a deviation is not indicative of a system anomaly. As such, a count of such errors may be used to identify normal patterns and identify when anomalies are present.

In other examples, the metrics may be associated with efficiency or performance of an application as reflected by, for example, application response time, application CPU utilization, and application resource utilization. In such examples, the metrics may be multivariable and capture only application response times or utilizations that are significantly deviant from normal values (e.g., response times or utilizations that are in below the $5^{th}$ percentile or above the $95^{th}$ percentile).

The anomaly analytics server is also configured to receive host data for each host at a first frequency for precognition processing. In the example embodiment, the first frequency is five minutes and the anomaly analytics server effectively receives raw event data in five minute summarizations and processes them into a summary index. In some examples, the first frequency may be predetermined or predefined based on defaults for the anomaly analytics server. In other examples, the first frequency may be variable and dependent upon conditions in the data center or computing systems such as, for example, whether there has been a prior anomaly detected. In such examples, if a prior anomaly has been detected in the past period (e.g., the past hour, day, or week), the first frequency may be set to a higher (or more frequent) period because of the elevated potential of subsequent prior anomalies. In other examples, the first frequency may be set based on the definition of the metrics. The anomaly analytics server processes the event data into a standardized uniform event schema prior to processing them into the summary index.

The anomaly analytics server process the host data of the associated metric for each host application to define a metric threshold associated with each associated metric. The metric thresholds are defined to indicate anomalous statuses in their corresponding host applications. The metric thresholds may also be set for a specific host tier, service tier, or a combination of a host tier, service tier, and application.

The anomaly analytics server generates the anomaly baseline based on the metric thresholds. The anomaly baseline, and the underlying metric thresholds, are designed to distinguish inconclusive data or "noise" from severe anomalies. As such, the anomaly analytics server applies a rating model to define the threshold. In some examples, a particular threshold or rating is determined based on a comparison between host application performance to varying levels of a metric for that host application. For example, a threshold or rating may be set based on when the quantitative performance of an application begins to fail to meet a required service level, or when the application deviates from what an administrator determines to be normal performance.

The anomaly analytics server is configured to receive a topology map associating each host with a host tier of a set of host tiers. The topology map also defines a set of tier dependencies between host tiers. In the example embodiment, the topology map is a directed acyclical graph that defines relationships between hosts, between hosts and host tiers, and between host tiers. A directed acyclical graph ("DAG") is a finite directed graph with no directed cycles and consists of finitely many vertices and edges. In a typical DAG, each edge is directed from one vertex to another, so that there is no way to start at any given vertex v and follow a consistently directed sequence of edges that loops back to vertex v. Therefore, DAGs have a topological ordering and a sequence of vertices so that every edge is directed from earlier to later in the sequence. An exemplary DAG is shown below in FIG. 9.

In particular, the topology map identifies dependency relationships between hosts and between host tiers. In one example, the topology map is described using extensible markup language (XML). In other examples, the topology map can be described using any suitable format. The topology map is generated using any suitable input including dynamic discovery of host and host tier relationships or administrator input.

In the example embodiment, the topology map also describes relative depth of host tiers and host applications as a measurement of host tiers and host applications from an end-user. In the example embodiment, relative depth is used in conjunction with a signal-echo algorithm to emphasize anomalous host tiers and host applications that are relatively removed from the end-user or "deeper" in the environment as more likely candidates for root cause host tier or root cause host identification. As used herein, "tier depth" and related terms including "depth of tier" may refer to the relative relationship between host tiers in relation to the level of the end-user. As used herein, "tier depth" may be quantified such that the end-user may have a tier depth value of, for example, zero, and the next proximate tier (e.g., an edge application tier) may be regarded as relatively deeper than the end-user tier and may further have a tier depth value of one. Similarly, the next most proximate tier (e.g., a front end application tier) may be regarded as relatively deeper than the end-user tier and the edge application tier, and may further have a tier depth value of two. The signal-echo algorithm or approach is valuable for synchronous request/reply multi-tier enterprise applications. In the anomaly analytics server, the signal-echo algorithm functions to assist in the isolation of the host tiers and host applications most likely to be tied to a critical anomaly. As such, the anomaly analytics server is configured to determine a tier depth associated with each host tier based on the topology map and to apply the signal-echo algorithm to the identification of the at least one host tier as the root cause host tier. As described, application of the signal-echo algorithm increases the likelihood of identifying a selected host tier as the at least one host tier based on the associated tier depth of the selected host tier.

As used herein, a "signal-echo algorithm" or a "signal-echo approach" is a communications pattern expressed in many synchronous multi-tier applications. Generally, the pattern begins when a request is sent by an endpoint, typically an end-user, and the request passes through multiple tiers of application computing infrastructure. Applying the terminology above, the request propagates from the end-user to "deeper" tiers and, for example, from an edge application tier to a front end application tier to deeper tiers. Each tier receives the request and may process the request before propagating the requests to a deeper tier. The deeper tiers may repeat this process, processing and then propagating requests to additional deeper tiers. This pattern of processing and propagating repeats until the final tier (i.e., the "deepest" tier) receives a request, processes it, and sends a response back. Further, all of the intermediary tiers may return a response in reverse order (i.e., from the deepest tier to the shallowest), until the shallowest tier is reached.

If an anomaly or an error occurs in one of the tiers, the request may cause each tier to check for such anomaly or error upon processing. Further responsive to the request, in such cases an anomaly event is created for the tier associated with the anomaly and if identifiable, a specific host (or hosts) involved is identified as associated with the anomaly event. Notably, the anomalous behavior may be echoed on the shallower (or preceding) tiers as the response passes back through the tiers on its way back to the endpoint that originated the request. As such, even though the anomaly manifests on the preceding tiers, these tiers may only be echoing, and not actually signaling. As such, in these cases a deeper tier may be associated with a "root cause" while shallower tiers may show echoes.

In other examples, the anomaly analytics server may use other algorithms to identify a "root cause". For example, in some cases, an anomaly event may occur on a shallower tier, and be echoed (or propagated) onto deeper tiers. In such examples, a shallower tier may be associated with a "root cause" and cause echoes onto deeper tiers. Where appropriate, the anomaly analytics server may be configured to use such an alternative algorithm.

In one example, an anomalous end-user login response time is associated with a login transaction that involves multiple tiers including a web tier, an application server tier, a message queue tier, and a mainframe tier. In this example, an end-user login generates a request to a web tier that processes the request, which in turn generates multiple requests to the application server tier, which in turn processes the request and generates multiple requests to the message queue, which in turn performs processing and generates requests to the mainframe. If a mainframe service ran long and produced an anomalous response time, such an elongated response time could be echoed on all of the subsequent tiers and would produce an anomaly event on the web, application, and message queue tiers. A reviewing team of users (e.g., a triage team) would be able to identify response time anomaly events on each of these four tiers and could have four candidates to consider as a "root cause" tier.

As such, a pattern of signal-echo is useful to identify root causes of anomalies. More specifically, the anomaly analytics server applies a signal-echo pattern associated with a topology map and a repeated (echoed) anomaly event occurring in the same sampling timeframe across two or more adjacent tiers.

In the above example involving an end-user log-in, the same response time anomaly event occurs in the same sampling timeframe across two or more adjacent tiers. As such, the signal-echo pattern dictates the signal mostly likely occurs on the tier farthest away from the original requestor (i.e., the end-user), or in the "deepest" tier (or leaf node of the tree) and farthest away from the root node. Consideration of the pattern indicates that the remaining tiers generating the same anomaly event are "echoes" of the root cause tier which signals the anomaly event. As described herein, the anomaly analytics server is configured to identify the "deepest" tier as the root cause tier and generate an alert indicating that identification.

The anomaly analytics server is also configured to receive event data associated with each host and host application. The event data includes log information for each host application related to application events, and further includes classification data including an associated host identifier, host tier identifier, timestamp, date stamp, service tier identifier, and system identifier.

The anomaly analytics server is configured to receive the anomaly baseline defining thresholds (including maximum and/or minimum thresholds) for identifying an anomalous status in each host application. In the example embodiment, the anomaly baseline is generated by the precognition process described above.

The anomaly analytics server is also configured to analyze the event data and the anomaly baseline to determine a host anomaly status for each host. Functionally, the anomaly analytics server compares relevant metric data from the event data for each host to the threshold set in the anomaly baseline for the associated metric. If an application host is associated with event data showing metric values falling below minimum or above maximum thresholds, that particular application host is identified as having a host anomaly status of anomalous or true. If an application host is not associated with event data showing metric values falling below minimum or above maximum thresholds, that particular application host is identified as having a host anomaly status of non-anomalous or false. In some examples, it may be useful for the relevant metrics of all applications for a given host tier to be reviewed in aggregate. In such examples, the anomaly baseline may define aggregate baselines for that host tier (e.g., baselines related to the total amount of errors for a particular host application for an entire host tier) and the host anomaly status may reflect a status for that individual host and relevant metrics for aggregation with other hosts in the host tier.

The anomaly analytics server is also configured to analyze the host anomaly status and the topology map to determine a tier anomaly status for each of the host tiers. As noted, in some examples, the anomaly analytics server determines whether a host tier has aggregate anomalies by processing and aggregating relevant metrics for an entire tier and comparing the aggregate metric to the associated aggregate baseline. The tier anomaly status is defined as follows:

If all hosts in a host tier have a host anomaly status of anomalous, the host tier is identified as having a systemic anomalous status. If at least one anomaly in a host tier indicates an aggregate anomaly (i.e., at least one aggregate metric for the host tier exceeds or falls below a maximum or minimum aggregate baseline threshold, respectively), the host tier is identified as having a systemic anomalous status.

If one or more, but not all hosts in a host tier have a host anomaly status of anomalous, and if the host tier does not indicate an aggregate anomaly, the host tier is identified as having a non-systemic anomalous status.

If no hosts in a host tier have a host anomaly status of anomalous and if the host tier does not indicate an aggregate anomaly, the host tier is identified as non-anomalous.

As such, the anomaly analytics server is configured to determine that any host anomaly status indicates an anomaly has occurred. Specifically, the anomaly analytics server is configured to determine the tier anomaly status of each of the host tiers as one of: a) non-systemic anomalous, b) systemic anomalous, and c) non-anomalous. In one example, the anomaly analytics server is configured to identify each host of a selected host tier by processing the topology map and identify the host anomaly status for each host of the selected host tier. The anomaly analytics server is also configured to aggregate the host anomaly status for each host of the selected host tier to determine an aggregated host anomaly status for the selected host tier. Upon determining that all hosts of the selected host tier have host anomaly statuses indicating anomaly or that the host tier indicates an aggregate anomaly (i.e., because the aggregate metric is outside the first aggregate threshold defined in the aggregate baseline), the anomaly analytics server is configured to determine that the selected host tier has a systemic anomalous tier anomaly status.

The anomaly analytics server is also configured to identify at least one host tier as a root cause host tier by processing the tier anomaly statuses and the set of tier dependencies. This step is valuable because, due to the interdependent nature of applications, hosts, and host tiers, the presence of an anomaly at one tier may result in anomalies at other tiers. To effectively reduce MTTR and ODMs and improve application availability, it is important to identify the primary host tier and/or host that is causing any secondary host tiers and/or hosts to indicate anomalies because resolution of issues in the primary host tier and/or host is the most probable path to addressing the anomalies in the system. As such, the anomaly analytics server applies the signal-echo algorithm. In one example, the anomaly analytics server identifies the at least one host tier as a root cause host tier by following the logic indicated below:

If a host tier has a tier anomaly status of "non-anomalous" it is ignored as a root cause host tier.

If a host tier has a tier anomaly status of "systemic anomalous" and it is associated with at least one dependent host tier that has a tier anomaly status of "systemic anomalous", the host tier is identified as a root cause host tier.

If a host tier has a tier anomaly status of "systemic anomalous" and it is associated with dependent host tier that have a tier anomaly statuses of "non-systemic anomalous" or "non-anomalous", the host tier is ignored as a root cause host tier.

If a host tier has a tier anomaly status of "non-systemic anomalous" and it is associated with at least one dependent host tier that has a tier anomaly status of "systemic anomalous", the host tier is identified as a root cause host tier.

If a host tier has a tier anomaly status of "non-systemic anomalous" and it is associated with dependent host tier that have a tier anomaly statuses of "non-systemic anomalous" or "non-anomalous", the host tier is ignored as a root cause host tier.

The anomaly analytics server is also configured to generate an alert identifying each root cause host tier as a probable root cause of an anomaly in the anomaly analysis system. The anomaly analytics server is configured to generate and transmit messages at any identified root cause tier when a root cause host tier is identified. In some cases, the anomaly analytics server may identify more than one probable root cause tier of an anomaly. In such cases, the anomaly analytics server is configured to recommend one of the identified probable root cause tiers as primary. In some examples, the anomaly analytics server will recommend probable root cause tiers that are "deeper" in the system based on the logic of signal-echo patterns.

As noted above, in other examples, the anomaly analytics server will apply an alternative algorithm and recommend probable root cause tiers that are "shallower" in the system. In further examples, the anomaly analytics server may apply other algorithms suitable to identify and recommend probable root cause tiers.

In further examples, the anomaly analytics server will quantify a confidence in the recommended probable root cause tier by comparing data associated with the identified probable root cause tiers and determining which tier has a greater deviation in its metric values from the anomaly baseline, and which tier is "deeper".

The anomaly analytics server is configured to generate alerts that are sent directly by the anomaly analytics server or conveyed through any suitable communications systems. In the example embodiment, the alert messages may be written in any suitable format including but not limited to human-readable message formats (e.g., YML or text) and data objects (e.g., JSON). The alert messages may be transmitted to any suitable monitoring or processing middleware (e.g., splunk) and conveyed to suitable messaging services. In the example embodiment, the alert includes a unique message identifier and a recommendation on host tiers and hosts that should be considered as probable root causes.

In some examples, the anomaly analytics server provides user interface dashboards to administrators to allow for review of anomaly events identified in precognition analysis and anomaly patterns identified in autocorrelation. In one example, an anomaly dashboard allows administrators to search and browse anomaly history based on time, host application, metric, and metric value. In another example, an autocorrelation dashboard allows administrators to search and browse alerts generated by the anomaly analytics server, and to review underlying data associated with the alerts. For example, the autocorrelation dashboard identifies recommended probable root cause tiers as well as other (non-recommended) probable root cause tiers.

Generally, the systems and methods described herein are configured to perform at least the following steps that may be performed in any order, and using any permutation of such steps: receive a topology map associating each host with a host tier, and defining a set of tier dependencies between the host tiers; receive event data associated with each host; receive an anomaly baseline defining thresholds for identifying an anomalous status in each host application; analyze the event data and the anomaly baseline to determine a host anomaly status for each host; analyze the host anomaly status and the topology map to determine a tier anomaly status for each of the host tiers; upon determining that any host anomaly status indicates an anomaly has occurred, identify at least one host tier as a root cause host tier by processing the tier anomaly statuses and the set of tier dependencies; generate an alert identifying each root cause host tier as a probable root cause of an anomaly in the anomaly analysis system; identify a metric associated with each host application; receive the host data for each host at a first frequency; process host data of the associated metric for each host application to define a metric threshold associated with each associated metric wherein the metric thresholds are defined to indicate anomalous statuses in their corresponding host applications; generate the anomaly baseline based on the metric thresholds; determine a tier depth associated with each host tier based on the topology map; apply a signal-echo algorithm to the identification of the at least one host tier as the root cause host tier, wherein the signal-echo algorithm increases the likelihood of identifying a selected host tier as the at least one host tier based on the associated tier depth of the selected host tier; determine the tier anomaly status of each of the host tiers as one of: a) non-systemic anomalous, b) systemic anomalous, and c) non-anomalous; identify each host of a selected host tier by processing the topology map; identify the host anomaly status for each host of the selected host tier; upon determining that all hosts of the selected host tier have host anomaly statuses indicating anomaly, determine that the selected host tier has a systemic anomalous tier anomaly status; identify each host of a selected host tier by processing the topology map; identify the host anomaly status for each host of the selected host tier; aggregate the host anomaly status for each host of the selected host tier to determine an aggregated host anomaly status for the selected host tier; upon determining that the aggregated host anomaly status is outside a first aggregate threshold, determine that the selected host tier has a systemic anomalous tier anomaly status; and process the set of tier dependencies and the tier anomaly statuses to identify each anomalous host tier with at least one dependent anomalous host tier as the root cause host tiers.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Each of the devices 102, 104, 106, 108 and 110 may be a source of an anomaly, which can be analyzed by the anomaly analyzer and methods described herein.

Figure 2:
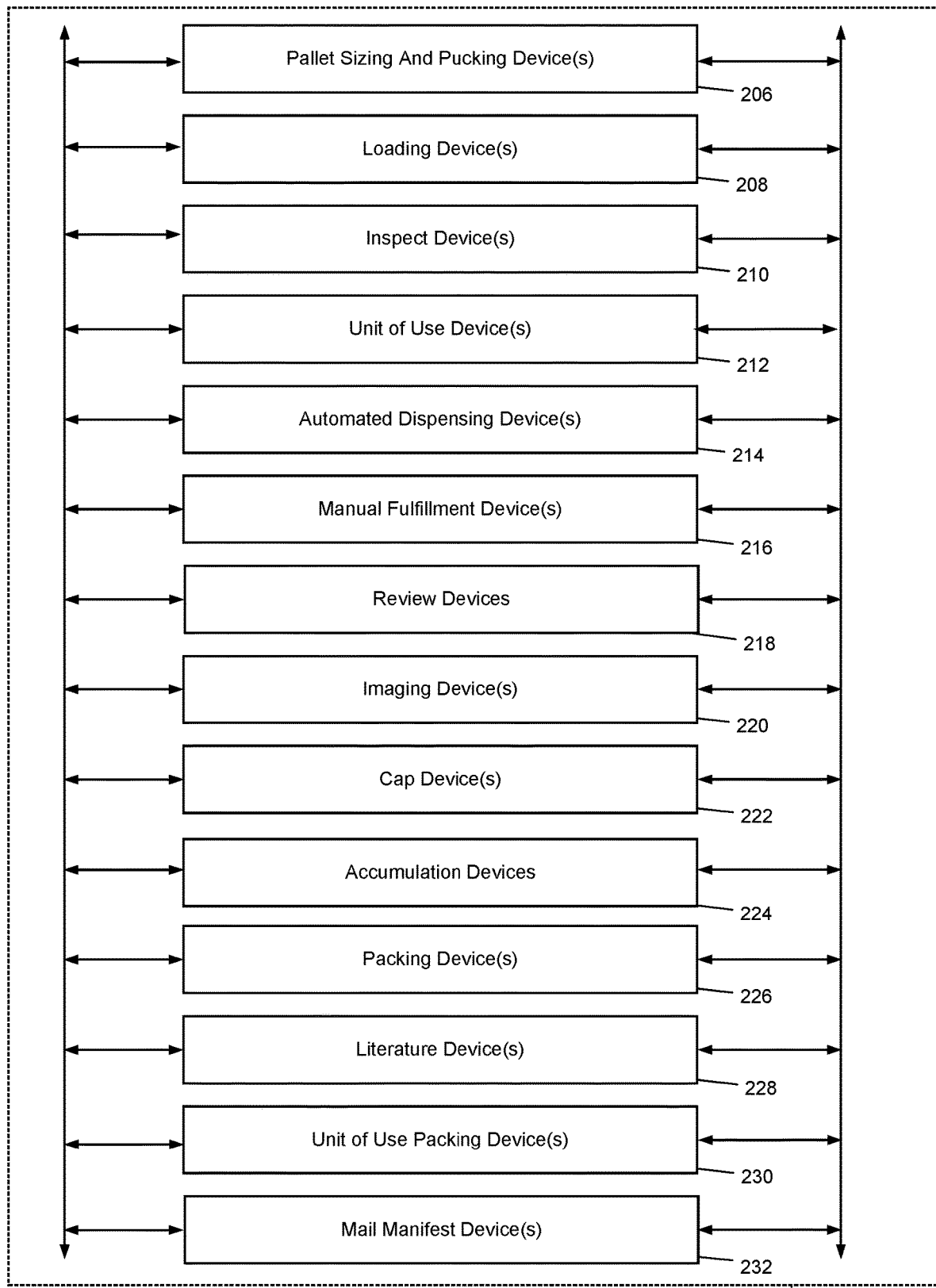
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Each of the devices in the pharmacy fulfillment device 112 may be a source of an anomaly, which can be analyzed by the anomaly analyzer and methods described herein.

Figure 3:
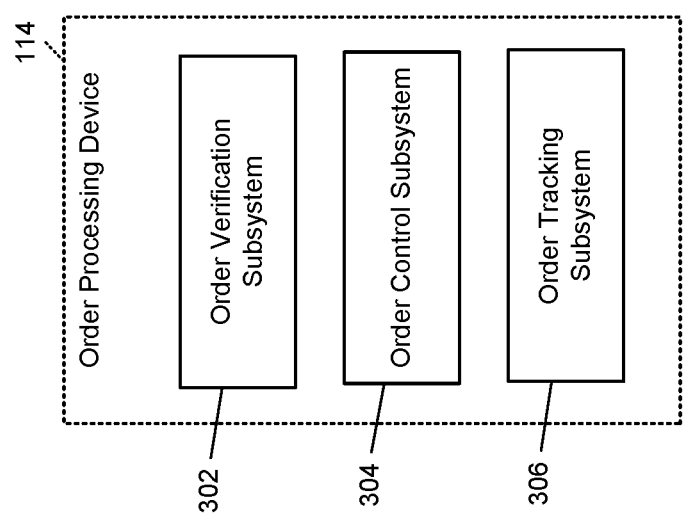
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may include order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Each of the subsystems 302, 304, or 306 in the order processing device 114 may be a source of an anomaly, which can be analyzed by the anomaly analyzer and methods described herein.

Figure 4:
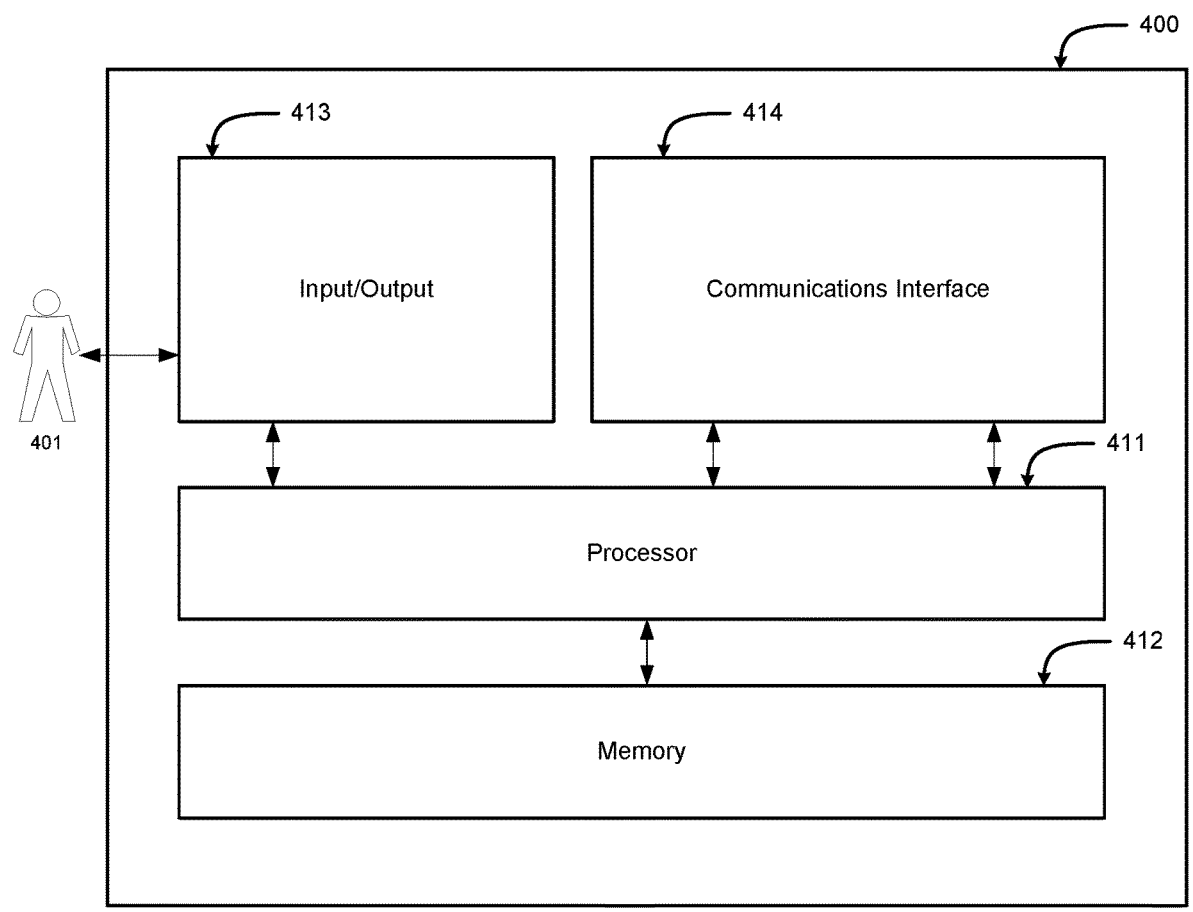
FIG. 4 is a functional block diagram of an example computing device that may be used in the environments described herein.

FIG. 4 is a functional block diagram of an example computing device 400 that may be used in the environments described herein. Specifically, computing device 400 illustrates an exemplary configuration of a computing device. Computing device 400 illustrates an exemplary configuration of a computing device operated by a user 401 in accordance with one embodiment of the present invention. Computing device 400 may include, but is not limited to, an anomaly analytics server, a host device, an inventory device, and any other system described herein. Computing device 400 may also include pharmacy devices 106 including pharmacy fulfillment devices 112, order processing devices 114, and pharmacy management devices 116, storage devices 110, benefit manager devices 102, and user devices 108 (all shown in FIG. 1), mobile computing devices, stationary computing devices, computing peripheral devices, smart phones, wearable computing devices, medical computing devices, and vehicular computing devices. Alternatively, computing device 400 may be any computing device capable of performing the diagnosing probable root causes of anomalies in computing environments as described herein. In some variations, the characteristics of the described components may be more or less advanced, primitive, or non-functional.

In the exemplary embodiment, computing device 400 includes a processor 411 for executing instructions. In some embodiments, executable instructions are stored in a memory area 412. Processor 411 may include one or more processing units, for example, a multi-core configuration. Memory area 412 is any device allowing information such as executable instructions and/or written works to be stored and retrieved. Memory area 412 may include one or more computer readable media.

Computing device 400 also includes at least one input/output component 413 for receiving information from and providing information to user 401. In some examples, input/output component 413 may be of limited functionality or non-functional as in the case of some wearable computing devices. In other examples, input/output component 413 is any component capable of conveying information to or receiving information from user 401. In some embodiments, input/output component 413 includes an output adapter such as a video adapter and/or an audio adapter. Input/output component 413 may alternatively include an output device such as a display device, a liquid crystal display (LCD), organic light emitting diode (OLED) display, or "electronic ink" display, or an audio output device, a speaker or headphones. Input/output component 413 may also include any devices, modules, or structures for receiving input from user 401. Input/output component 413 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 413. Input/output component 413 may further include multiple sub-components for carrying out input and output functions.

Computing device 400 may also include a communications interface 414, which may be communicatively coupleable to a remote device such as a remote computing device, a remote server, or any other suitable system. Communications interface 414 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 414 is configured to allow computing device 400 to interface with any other computing device or network using an appropriate wireless or wired communications protocol such as, without limitation, BLUETOOTH®, Ethernet, or IEE 802.11. Communications interface 414 allows computing device 400 to communicate with any other computing devices with which it is in communication or connection.

Figure 5:
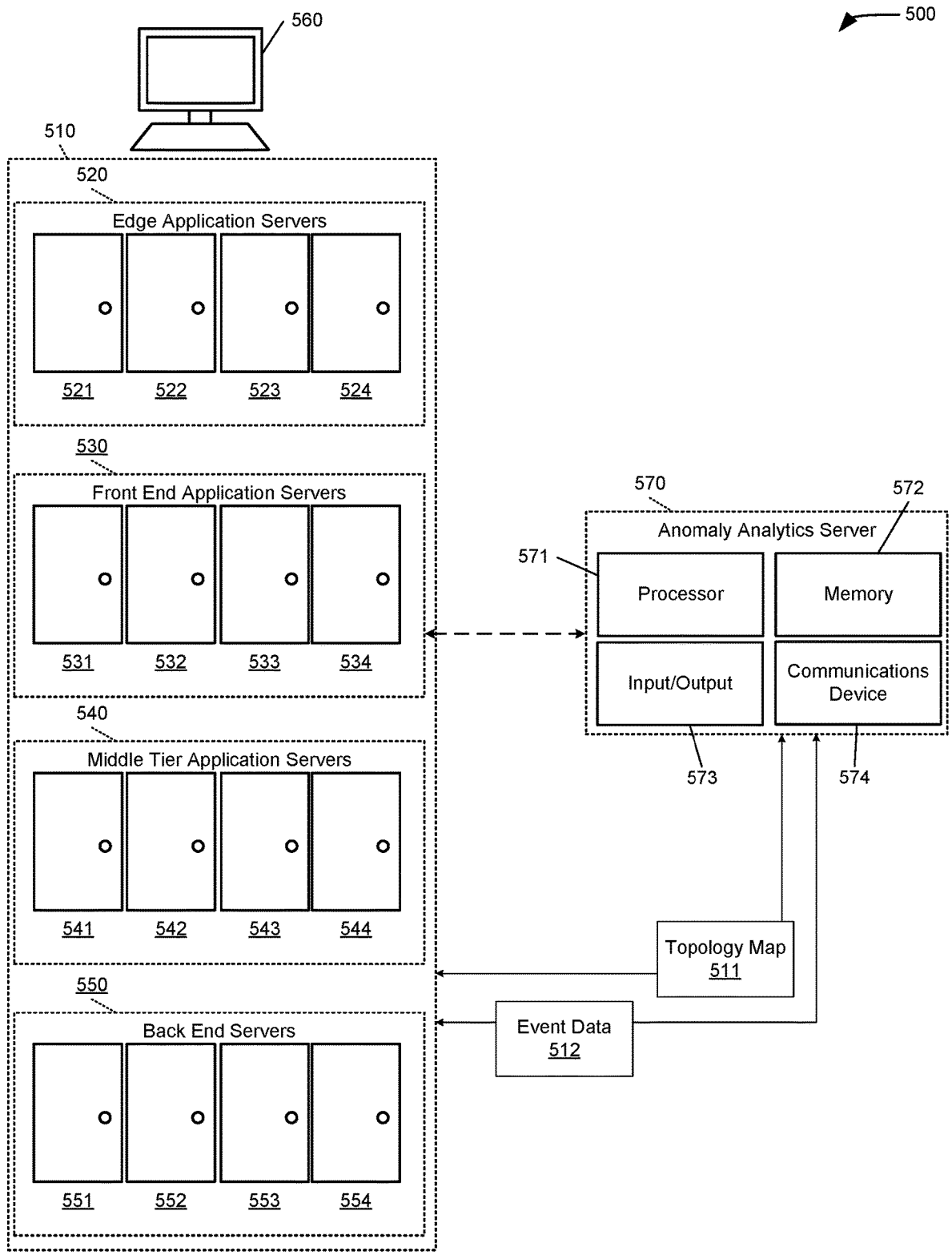
FIG. 5 is a functional block diagram of an anomaly analytics system for diagnosing probable root causes of anomalies in computing environments, including an anomaly analytics server and multiple computing devices shown in FIG. 4.

FIG. 5 is a functional block diagram of an anomaly analytics system 500 for diagnosing probable root causes of anomalies in computing environments, including multiple computing devices 521, 522, 523, 524, 531, 532, 533, 534, 541, 542, 543, 544, 551, 552, 553, 554, 560, and 570 similar to the computing device 400 shown in FIG. 4. Host devices 521, 522, 523, 524, 531, 532, 533, 534, 541, 542, 543, 544, 551, 552, 553, and 554 represent hosts capable of providing services including host applications to the computing environment. Each host device 521, 522, 523, 524, 531, 532, 533, 534, 541, 542, 543, 544, 551, 552, 553, and 554 includes a processor (not shown) similar to processor 411 of computing device 400, a memory (not shown) similar to memory 412 of computing device 400, an input/output (not shown) similar to input/output 413 of computing device 400, and a communications device (not shown) similar to communications device 414 of computing device 400. Each processor is configured to provide at least one host application or service. Anomaly analytics server 570 is configured to facilitate or execute many of the processes described herein, and to coordinate the principal methods of diagnosing probable root causes of anomalies in computing environment 500, as well as to provide the functionality described herein. Anomaly analytics server 570 includes a processor 571, a memory 572, an input/output 573, and a communications device 574. User device 560 represents an end-user computing device used to access the applications in infrastructure 510 including those provided by host devices 521, 522, 523, 524, 531, 532, 533, 534, 541, 542, 543, 544, 551, 552, 553, and 554. Computing devices 521, 522, 523, 524, 531, 532, 533, 534, 541, 542, 543, 544, 551, 552, 553, 554, 560, and 570 are in networked communication.

In the example embodiment, host devices 521, 522, 523, 524, 531, 532, 533, 534, 541, 542, 543, 544, 551, 552, 553, and 554 are segmented into host tiers 520, 530, 540, and 550. Host tiers 520, 530, 540, and 550 are illustrative examples of how host devices may be tiered in a computing environment as described herein. In the example embodiment, host tier 520 represents a tier of edge application servers configured to provide an entry point into infrastructure 510 for external devices like user device 560. Functionally, the edge application servers of host tier 520 may provide, for example, presentation layer applications. Host tier 530 represents a tier of front end application servers configured to provide service layer applications that are relied upon by host tier 520. Host tier 540 represents a tier of middle tier application servers configured to provide business layer applications that are relied upon by host tier 530 and resultantly by host tier 520. Host tier 550 represents a tier of backend application servers configured to provide data access applications that are relied upon by host tier 540 and resultantly by host tiers 530 and 520. As such, in the example embodiment, host tier 520 depends directly upon host tier 530 and indirectly on host tiers 540 and 550, host tier 530 depends directly on host tier 540 and indirectly on host tier 550, and host tier 540 depends directly on host tier 550. In more complex examples (not shown), the host tiers may have more complex dependencies.

As described herein, the anomaly analytics server 570 receives a topology map 511 that associates each host 521, 522, 523, 524, 531, 532, 533, 534, 541, 542, 543, 544, 551, 552, 553, and 554 with a host tier of the set of host tiers 520, 530, 540, and 550. Thus, for example, topology map 511 indicates that hosts 521, 522, 523, and 524 are associated with host tier 520, that hosts 531, 532, 533, and 534 are associated with host tier 530, that hosts 541, 542, 543, and 544 are associated with host tier 540, and that host tier 551, 552, 553, and 554 are associated with host tier 550. Topology map 511 may also specify connectivity between hosts 521, 522, 523, 524, 531, 532, 533, 534, 541, 542, 543, 544, 551, 552, 553, and 554. Topology map 511 also defines a set of tier dependencies between host tiers 520, 530, 540, and 550, and will therefore indicate (in the illustrated example) that host tier 520 depends directly upon host tier 530 and indirectly on host tiers 540 and 550, host tier 530 depends directly on host tier 540 and indirectly on host tier 550, and host tier 540 depends directly on host tier 550. In the example embodiment, topology map 511 is a directed acyclical graph that defines relationships between hosts 521, 522, 523, 524, 531, 532, 533, 534, 541, 542, 543, 544, 551, 552, 553, and 554, between hosts 521, 522, 523, 524, 531, 532, 533, 534, 541, 542, 543, 544, 551, 552, 553, and 554 and host tiers 520, 530, 540, and 550, and between host tiers 520, 530, 540, and 550. In one example, topology map 511 is described using extensible markup language (XML). In other examples, topology map 511 can be described using any suitable format. Topology map 511 is generated using any suitable input including dynamic discovery of host and host tier relationships or administrator input. As used herein, "dynamic discovery" refers to the automatic detection of hosts, host applications, host services, tiers or groupings of hosts, or tiers or groupings of host applications. Dynamic discovery is performed by a system including, for example, anomaly analytics server 570 or any other system in communication therewith. In the example embodiment, dynamic discovery is performed by using network protocols and agents to discover hosts, services, applications, and tiers. The protocols may include, but are not limited to, dynamic host configuration protocol ("DHCP"), domain name system service discovery ("DNS-SD"), and service location protocol ("SLP").

In the example embodiment, topology map 511 also describes relative depth of host tiers 520, 530, 540, and 550, hosts and host applications as a measurement of host tiers, hosts and host applications from an end-user. In the example embodiment, relative depth is used in conjunction with a signal-echo algorithm to emphasize anomalous host tiers and host applications that are relatively removed from the end-user or "deeper" in the environment as more likely candidates for root cause host tier or root cause host identification. In the illustrated example, for instance, host tier 550 is the deepest tier (farthest from user device 560), and host tier 540 is next deepest followed by host tier 530 and host tier 520.

Anomaly analytics server 570 is also configured to receive event data 512 associated with each host 521, 522, 523, 524, 531, 532, 533, 534, 541, 542, 543, 544, 551, 552, 553, and 554 and host application. The event data includes log information for each host application related to application events, and further includes classification data including an associated host identifier, host tier identifier, time-stamp, date stamp, service tier identifier, and service identifier. Event data 512 is used to perform the functions described herein including both the precognition and autocorrelation functions.

Figure 6:
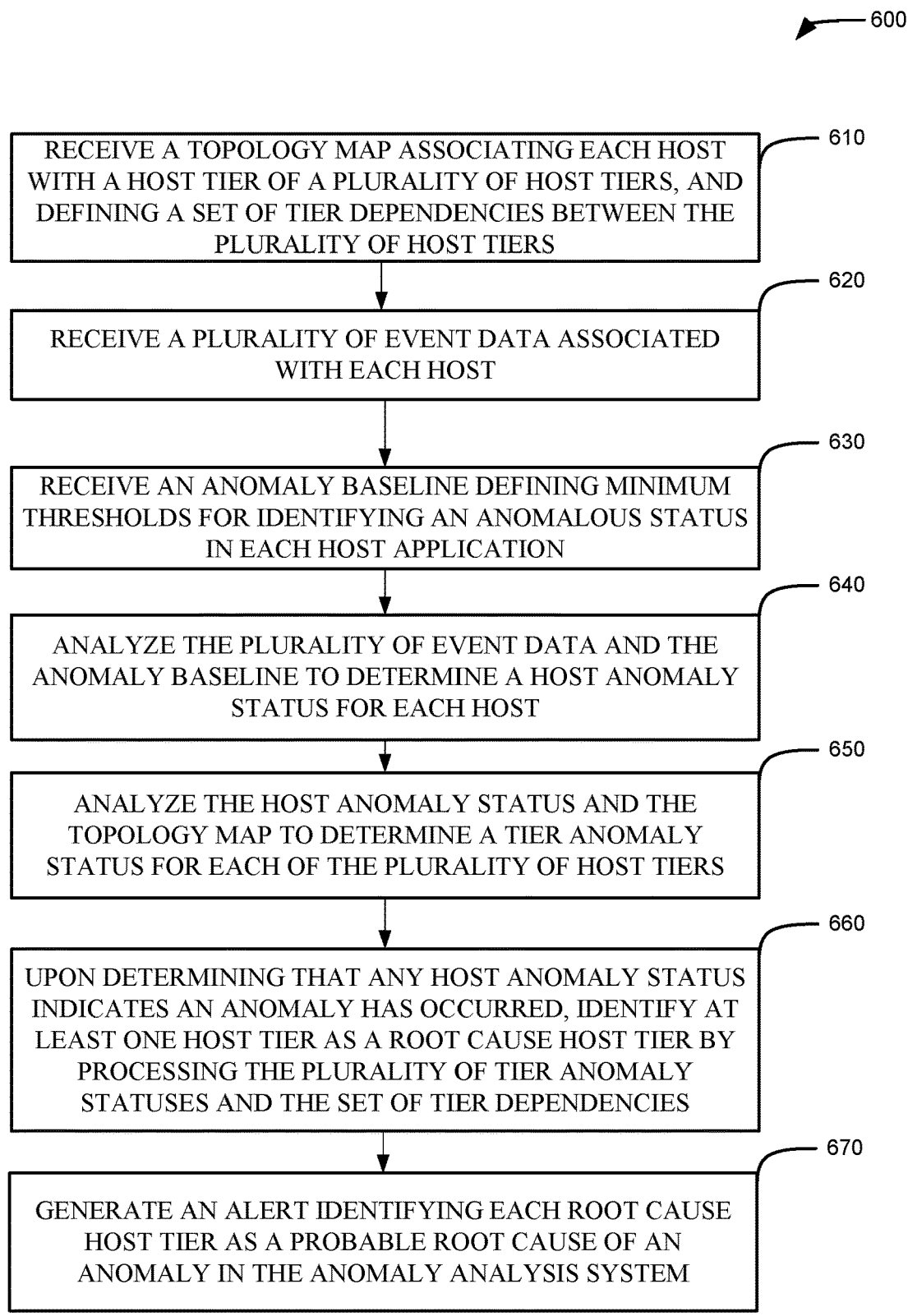
FIG. 6 is a flow diagram representing a method for diagnosing probable root causes of anomalies in computing environments performed by the anomaly analytics server shown in FIG. 5.

FIG. 6 is a flow diagram representing a method 600 for diagnosing probable root causes of anomalies in computing environments performed by the anomaly analytics server 570 of the anomaly analysis system 500 shown in FIG. 5. The anomaly analytics server 570 is configured to receive 610 a topology map 511 associating each host 521, 522, 523, 524, 531, 532, 533, 534, 541, 542, 543, 544, 551, 552, 553, and 554 with a host tier of a plurality of host tiers 520, 530, 540, and 550, and defining a set of tier dependencies between the plurality of host tiers 520, 530, 540, and 550. The anomaly analytics server 570 is configured to receive 620 a plurality of event data 512 associated with each host 521, 522, 523, 524, 531, 532, 533, 534, 541, 542, 543, 544, 551, 552, 553, and 554. The anomaly analytics server 570 is configured to receive 630 an anomaly baseline defining minimum thresholds for identifying an anomalous status in each host application. The anomaly analytics server 570 is also configured to analyze 640 the plurality of event data 512 and the anomaly baseline to determine a host anomaly status for each host 521, 522, 523, 524, 531, 532, 533, 534, 541, 542, 543, 544, 551, 552, 553, and 554. The anomaly analytics server 570 is configured to analyze 650 the host anomaly status and the topology map 511 to determine a tier anomaly status for each of the plurality of host tiers 520, 530, 540, and 550. The anomaly analytics server 570 is configured to identify 660 at least one host tier as a root cause host tier by processing the plurality of tier anomaly statuses and the set of tier dependencies, upon determining that any host anomaly status indicates an anomaly has occurred. The anomaly analytics server 570 is configured to generate 670 an alert identifying each root cause host tier as a probable root cause of an anomaly in the anomaly analysis system 500.

Figure 7:
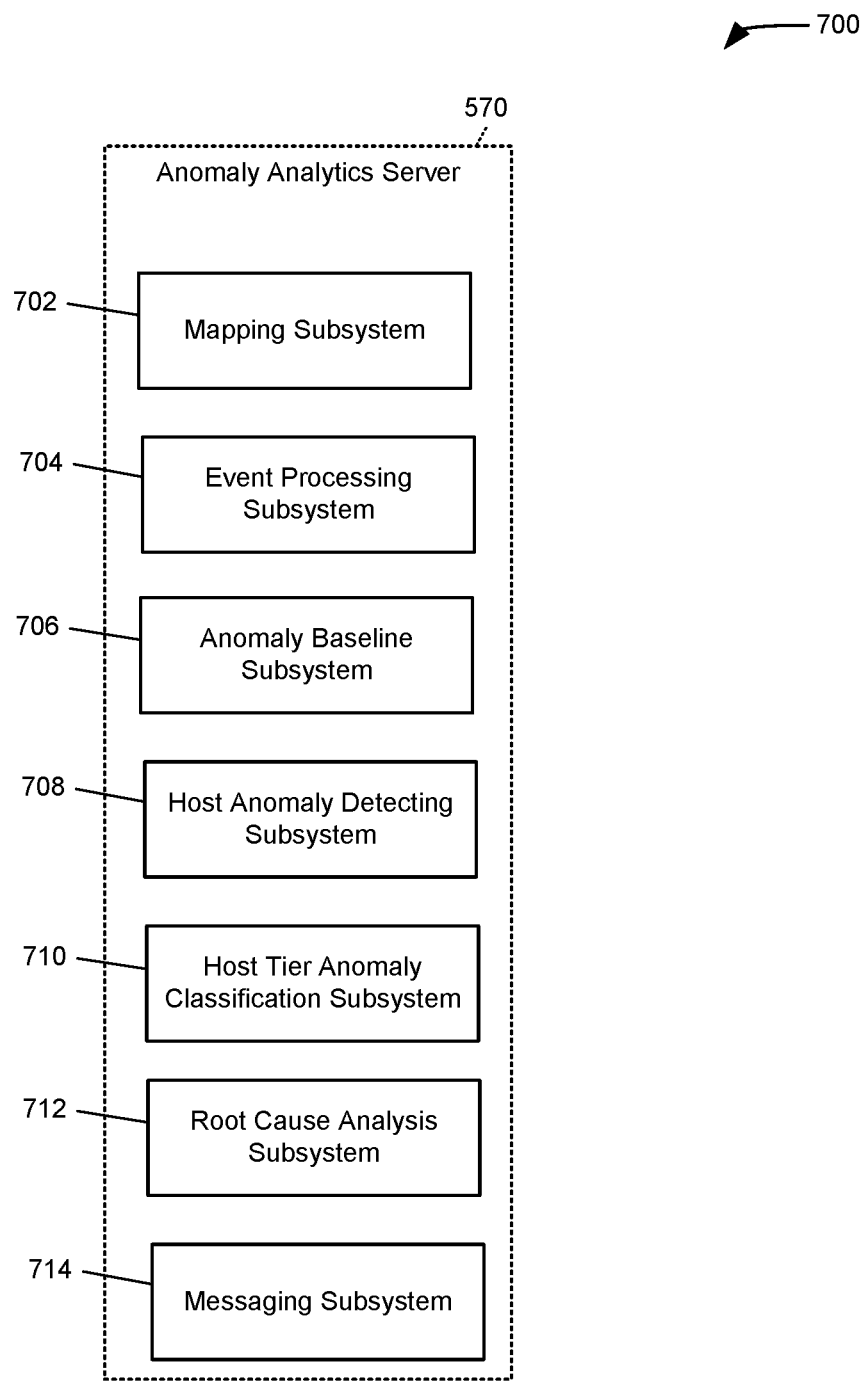
FIG. 7 is a diagram of elements of one or more example computing devices that may be used in the system shown in FIGS. 1-5.

FIG. 7 is a diagram of elements of one or more example computing devices that may be used in the system shown in FIGS. 1-5. As described herein, the elements 702, 704, 706, 708, 710, 712, and 714 are configured to perform the processes and methods described herein. Mapping subsystem 702 is configured to perform steps related to receiving and processing topology map 511 and, in some embodiments, generating topology map 511. Event processing subsystem 704 is configured to perform steps including receiving and processing event data 512 for at least the precognition and autocorrelation steps described herein. Anomaly baseline subsystem 706 is configured to perform the steps of generating anomaly baselines and aggregate baselines, including generating thresholds and aggregate thresholds, as described herein. Host anomaly detecting subsystem 708 is configured to provide the functions of determining whether a host is anomalous based upon event data 512 and anomaly baselines, as described herein. Host tier anomaly classification subsystem 710 is configured to classify host tiers as systemic anomalous, non-systemic anomalous, and non-anomalous, according to the methods described herein. Root cause analysis subsystem 712 is configured to determine at least one host tier or host associated with a probable root cause of an anomaly, based on the methods described herein including application of the signal-echo algorithm. Messaging subsystem 714 is configured to generate messages, alerts, displays, and dashboards to provide administrators, users, and other systems with notifications of identified root cause tiers and related information, as described herein.

Figure 8:
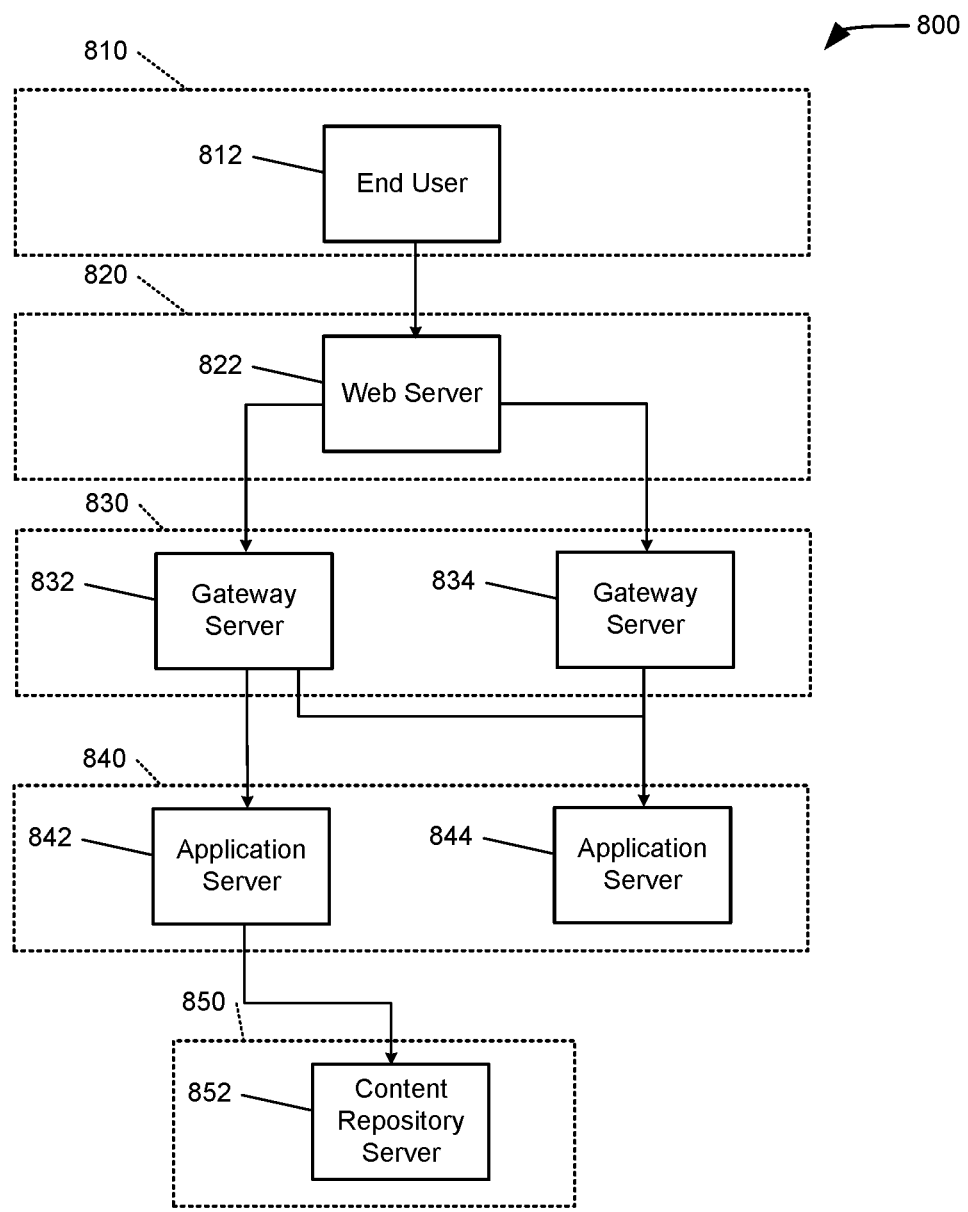
FIG. 8 is a first example of a topology map that defines relationships between hosts, between hosts and host tiers, and between host tiers, for use by the anomaly analytics system shown in FIG. 5.

FIG. 8 is a first example of a topology map 800 that defines relationships between hosts, between hosts 812, 822, 832, 834, 842, 844, and 852 and host tiers 810, 820, 830, 840, and 850, and between host tiers, for use by the anomaly analytics system 570 (shown in FIG. 5). Specifically, topology map 800 defines the relationships and indicates that, for example, end user host 812 is associated with end user tier 810, web server 822 is associated with an edge tier 820, gateway servers 832 and 834 are associated with a front end tier 830, application servers 842 and 844 are associated with middle tier 840, and content repository server 852 is associated with backend tier 852. In some examples, topology map 800 may contain more or fewer tiers, different tiers, and different hosts at each tier. Topology map 800 further defines connectivity relationships between hosts 812, 822, 832, 834, 842, 844, and 852.

Figure 9:
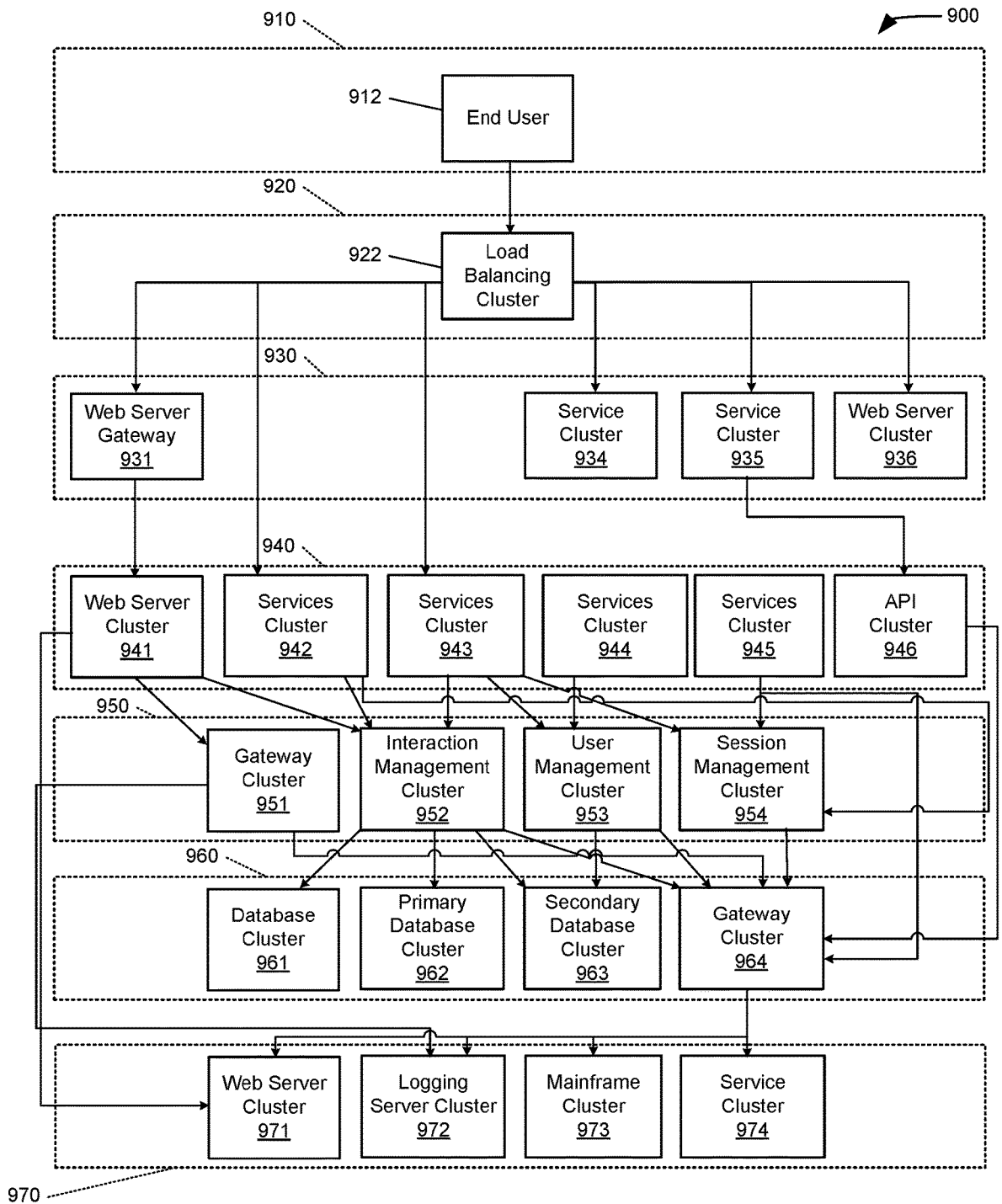
FIG. 9 is a second example of a topology map that defines relationships between hosts, between hosts and host tiers, and between host tiers, for use by the anomaly analytics system shown in FIG. 5.

FIG. 9 is a second example of a topology map 900 that defines relationships between hosts, between hosts 912, 922, 931, 934, 935, 936, 941, 942, 943, 944, 945, 946, 951, 952, 953, 954, 961, 962, 963, 964, 971, 972, 973, and 974 and host tiers 910, 920, 930, 940, 950, 960, and 970, and between host tiers, for use by the anomaly analytics system 570 (shown in FIG. 5). Topology map 900 describes a more complex set of relationships wherein many hosts have relationships spanning multiple tiers. As such, in this example, topology map 900 may be used to describe more complex and sophisticated signal-echo patterns such that, for example, a signal may echo onto non-consecutive tiers. As described herein, topology map 900 may be representative of a directed acyclical graph ("DAG"). Topology maps 800 and 900 are provided for illustrative purposes and in operation, any suitable alternative known topology map may be used in the systems described.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An anomaly analysis system for diagnosing probable root causes of anomalies in computing environments, comprising:
   a plurality of hosts, wherein each of the hosts includes a host processor and a host memory, wherein each of the host processors executes at least one host application;
   an anomaly analytics server including a processor and a memory, wherein the anomaly analytics server is in networked communication with the plurality of hosts via a network, wherein the processor is configured to:
      receive, at the anomaly analytics server, a topology map associating each host with a host tier of a plurality of host tiers, and defining a set of tier dependencies between the plurality of host tiers;
      receive a plurality of event data associated with each host at the anomaly analytics server;
      receive an anomaly baseline defining thresholds for identifying an anomalous status in each host application at the anomaly analytics server;
      analyze, at the anomaly analytics server, the plurality of event data and the anomaly baseline to determine a host anomaly status for each host;
      analyze, at the anomaly analytics server, the host anomaly status and the topology map to determine a tier anomaly status for each of the plurality of host tiers;
      upon determining that any host anomaly status indicates an anomaly has occurred, identify, at the anomaly analytics server, at least one host tier as a root cause host tier by processing the plurality of tier anomaly statuses and the set of tier dependencies; and
      generate, at the anomaly analytics server, an alert identifying each root cause host tier as a probable root cause of an anomaly in the anomaly analysis system.

2. The system of claim 1, wherein the processor is further configured to:
   identify a metric associated with each host application;
   receive the plurality of host data for each host at a first frequency;
   process the plurality of host data of the associated metric for each host application to define a metric threshold associated with each associated metric wherein the metric thresholds are defined to indicate anomalous statuses in their corresponding host applications; and
   generate the anomaly baseline based on the metric thresholds.

3. The system of claim 1, wherein the processor is further configured to:
   determine a tier depth associated with each host tier based on the topology map; and
   apply a signal-echo algorithm to the identification of the at least one host tier as the root cause host tier, wherein the signal-echo algorithm increases the likelihood of identifying a selected host tier as the at least one host tier based on the associated tier depth of the selected host tier.

4. The system of claim 1, wherein the processor is further configured to:
   determine the tier anomaly status of each of the plurality of host tiers as one of: a) non-systemic anomalous, b) systemic anomalous, and c) non-anomalous.

5. The system of claim 4, wherein the processor is further configured to:
   identify each host of a selected host tier by processing the topology map;
   identify the host anomaly status for each host of the selected host tier; and
   upon determining that all hosts of the selected host tier have host anomaly statuses indicating anomaly, determine that the selected host tier has a systemic anomalous tier anomaly status.

6. The system of claim 4, wherein the processor is further configured to:
   identify each host of a selected host tier by processing the topology map;
   identify the host anomaly status for each host of the selected host tier;
   aggregate the host anomaly status for each host of the selected host tier to determine an aggregated host anomaly status for the selected host tier; and
   upon determining that the aggregated host anomaly status is outside a first aggregate threshold, determine that the selected host tier has a systemic anomalous tier anomaly status.

7. The system of claim 1, wherein the processor is further configured to:
   process the set of tier dependencies and the tier anomaly statuses to identify each anomalous host tier with at least one dependent anomalous host tier as the root cause host tiers.

8. An anomaly analytics server for diagnosing probable root causes of anomalies in computing environments, the anomaly analytics server including a processor and a memory, wherein the anomaly analytics server is in networked communication with a plurality of hosts via a network, wherein each of the plurality of hosts includes a host processor and a host memory, wherein each of the host processors executes at least one host application, wherein the processor is configured to:
   receive, at the anomaly analytics server, a topology map associating each host with a host tier of a plurality of host tiers, and defining a set of tier dependencies between the plurality of host tiers;
   receive a plurality of event data associated with each host at the anomaly analytics server;
   receive an anomaly baseline defining thresholds for identifying an anomalous status in each host application at the anomaly analytics server;
   analyze, at the anomaly analytics server, the plurality of event data and the anomaly baseline to determine a host anomaly status for each host;
   analyze, at the anomaly analytics server, the host anomaly status and the topology map to determine a tier anomaly status for each of the plurality of host tiers;
   upon determining that any host anomaly status indicates an anomaly has occurred, identify, at the anomaly analytics server, at least one host tier as a root cause host tier by processing the plurality of tier anomaly statuses and the set of tier dependencies; and
   generate, at the anomaly analytics server, an alert identifying each root cause host tier as a probable root cause of an anomaly.

9. The anomaly analytics server of claim 8, wherein the processor is further configured to:
   identify a metric associated with each host application;
   receive the plurality of host data for each host at a first frequency;
   process the plurality of host data of the associated metric for each host application to define a metric threshold associated with each associated metric wherein the metric thresholds are defined to indicate anomalous statuses in their corresponding host applications; and
   generate the anomaly baseline based on the metric thresholds.

10. The anomaly analytics server of claim 8, wherein the processor is further configured to:
    determine a tier depth associated with each host tier based on the topology map; and
    apply a signal-echo algorithm to the identification of the at least one host tier as the root cause host tier, wherein the signal-echo algorithm increases the likelihood of identifying a selected host tier as the at least one host tier based on the associated tier depth of the selected host tier.

11. The anomaly analytics server of claim 8, wherein the processor is further configured to:
    determine the tier anomaly status of each of the plurality of host tiers as one of: a) non-systemic anomalous, b) systemic anomalous, and c) non-anomalous.

12. The anomaly analytics server of claim 11, wherein the processor is further configured to:
    identify each host of a selected host tier by processing the topology map;
    identify the host anomaly status for each host of the selected host tier; and
    upon determining that all hosts of the selected host tier have host anomaly statuses indicating anomaly, determine that the selected host tier has a systemic anomalous tier anomaly status.

13. The anomaly analytics server of claim 11, wherein the processor is further configured to:
    identify each host of a selected host tier by processing the topology map;
    identify the host anomaly status for each host of the selected host tier;
    aggregate the host anomaly status for each host of the selected host tier to determine an aggregated host anomaly status for the selected host tier; and
    upon determining that the aggregated host anomaly status is outside a first aggregate threshold, determine that the selected host tier has a systemic anomalous tier anomaly status.

14. The anomaly analytics server of claim 8, wherein the processor is further configured to:
    process the set of tier dependencies and the tier anomaly statuses to identify each anomalous host tier with at least one dependent anomalous host tier as the root cause host tiers.

15. A method for diagnosing probable root causes of anomalies in computing environments performed by an anomaly analytics server including a processor and a memory, wherein the anomaly analytics server is in networked communication with a plurality of hosts via a network, wherein each of the plurality of hosts includes a host processor and a host memory, wherein each of the host processors executes at least one host application, the method comprising:

receiving, at the anomaly analytics server, a topology map associating each host with a host tier of a plurality of host tiers, and defining a set of tier dependencies between the plurality of host tiers;

receiving a plurality of event data associated with each host at the anomaly analytics server;

receiving an anomaly baseline defining thresholds for identifying an anomalous status in each host application at the anomaly analytics server;

analyzing, at the anomaly analytics server, the plurality of event data and the anomaly baseline to determine a host anomaly status for each host;

analyzing, at the anomaly analytics server, the host anomaly status and the topology map to determine a tier anomaly status for each of the plurality of host tiers;

upon determining that any host anomaly status indicates an anomaly has occurred, identifying, at the anomaly analytics server, at least one host tier as a root cause host tier by processing the plurality of tier anomaly statuses and the set of tier dependencies; and generating, at the anomaly analytics server, an alert identifying each root cause host tier as a probable root cause of an anomaly.

16. The method of claim 15, further comprising:
identifying a metric associated with each host application;
receiving the plurality of host data for each host at a first frequency;
processing the plurality of host data of the associated metric for each host application to define a metric threshold associated with each associated metric wherein the metric thresholds are defined to indicate anomalous statuses in their corresponding host applications; and
generating the anomaly baseline based on the metric thresholds.

17. The method of claim 15, further comprising:
determining a tier depth associated with each host tier based on the topology map; and
applying a signal-echo algorithm to the identification of the at least one host tier as the root cause host tier, wherein the signal-echo algorithm increases the likelihood of identifying a selected host tier as the at least one host tier based on the associated tier depth of the selected host tier.

18. The method of claim 15, further comprising:
determining the tier anomaly status of each of the plurality of host tiers as one of:
a) non-systemic anomalous, b) systemic anomalous, and c) non-anomalous.

19. The method of claim 18, further comprising:
identifying each host of a selected host tier by processing the topology map;
identifying the host anomaly status for each host of the selected host tier; and
upon determining that all hosts of the selected host tier have host anomaly statuses indicating anomaly, determining that the selected host tier has a systemic anomalous tier anomaly status.

20. The method of claim 15, further comprising:
processing the set of tier dependencies and the tier anomaly statuses to identify each anomalous host tier with at least one dependent anomalous host tier as the root cause host tiers.

* * * * *